(12) United States Patent
Kuzunuki et al.

(10) Patent No.: US 6,369,805 B1
(45) Date of Patent: Apr. 9, 2002

(54) INFORMATION PROCESSING SYSTEM

(75) Inventors: Soushiro Kuzunuki, Katsuta; Hiroshi Shoujima, Kashiwa; Toshimi Yokota, Hitachioota; Toshifumi Arai; Masaki Miura, both of Hitachi; Keiko Gunji, Mito; Yasushi Fukunaga, Hitachi; Toshio Tanaka, Yokohama; Masaaki Kitajima, Hitachioota, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/591,284

(22) Filed: Jun. 9, 2000

Related U.S. Application Data

(63) Continuation of application No. 09/217,915, filed on Dec. 21, 1998, now Pat. No. 6,081,260, which is a continuation of application No. 08/919,760, filed on Aug. 28, 1997, now Pat. No. 5,864,335, which is a continuation of application No. 08/333,134, filed on Nov. 1, 1994, now abandoned.

(30) Foreign Application Priority Data

Nov. 1, 1993 (JP) ............................................. 5-273375

(51) Int. Cl.$^7$ ................................................. G09G 5/00
(52) U.S. Cl. ....................................... 345/173; 345/179
(58) Field of Search ................................ 345/179, 173, 345/174, 175, 176, 177, 178, 180, 1, 2, 3; 178/18.01, 18.1, 19.01, 19.02, 19.03, 19.04

(56) References Cited

U.S. PATENT DOCUMENTS

| 3,848,247 A | 11/1974 | Sherr ............................. 345/6 |
| 4,716,542 A | 12/1987 | Peltz et al. .................. 345/173 |
| 4,730,186 A | 3/1988 | Koga et al. |
| 5,229,764 A | 7/1993 | Matchett et al. ........ 340/825.34 |
| 5,247,138 A | * 9/1993 | Landmeier .................... 178/19 |
| 5,300,943 A | * 4/1994 | Jackobs et al. ............. 345/173 |
| 5,864,335 A | 1/1999 | Kuzunuki et al. .......... 345/173 |

FOREIGN PATENT DOCUMENTS

| GB | 2193827 | 2/1988 |
| JP | 59-183428 | 10/1984 |
| JP | 61-88325 | 5/1986 |
| JP | 61-136118 | 6/1986 |
| JP | 63-36330 | 2/1988 |
| JP | 2-127714 | 5/1990 |
| JP | 4-15717 | 1/1992 |
| JP | 4-15725 | 1/1992 |
| JP | 4-278658 | 10/1992 |
| JP | 5-73203 | 3/1993 |
| WO | 91/05327 | 4/1991 |

OTHER PUBLICATIONS

R. Wolfe, "Keyboard for Electronic Tablet or Digitizer", *IBM Technical Disclosure Bulletin*, vol. 14, No. 3, Aug. 1971, pp. 807–808.

* cited by examiner

*Primary Examiner*—Xiao Wu
(74) *Attorney, Agent, or Firm*—Antonelli, Terry, Stout & Kraus, LLP

(57) ABSTRACT

The present invention relates to an information processing system using a coordinate detection device and displays, and more specifically to an input-display integrated information processing system which allows the displays to be carried like paper and to be freely laid out and stacked together on a desk (coordinate input device). The system includes a layout determining unit for determining a layout of the display on said coordinate detection device, wherein the layout determining unit further comprises a display position coordinate detector that detects where in the coordinate space of the coordinate detection device the display for displaying an information is located, and a coordinate converter that converts the information into display coordinates. The layout determination is done by using markers attached to three of the four corners of the display.

2 Claims, 16 Drawing Sheets

INFORMATION PROCESSING SYSTEM

CROSS-REFERENCE TO RELATED APPLICATIONS

This application is a continuation of application Ser. No. 09/217,915 filed on Dec. 21, 1998, now U.S. Pat. No. 6,081,260, which is a continuation of application Ser. No. 08/919,760 filed on Aug. 28, 1997, now U.S. Pat. No. 5,864,335, which is a continuation of application Ser. No. 08/333,134 filed on Nov. 1, 1994, now abandoned.

BACKGROUND OF THE INVENTION

The present invention relates to an information processing system using a coordinate input device and a display, and more specifically to an input-display integrated, pen-input information processing system, which allows the display to be carried like paper and freely laid out on a desk (coordinate input device) and which further permits two or more displays stacked together.

Among conventional input processing systems, which integrate a liquid crystal display and a coordinate input device (tablet) into one unit and can be used like paper, are Japanese Patent Laid-Open No. 88325/1986, UK Patent Application GB 2,193,827A and U.S. Pat. No. 4,730,186. As a conventional example of technique that provides coordinate correspondence between liquid crystal elements and a coordinate input device (tablet), there is Japanese Patent Laid-Open No. 183428/1984 (U.S. Pat. No. 4,646, 073). Further, Japanese Patent Laid-Open No. 36330/1988 discloses a system that allows 90-degree rotations of contents shown on the liquid crystal display, in addition to a normal display, for use with customer services at windows. Japanese Patent Laid-Open No. 73203/1993 offers a system which allows a paper frame to be moved or rotated as desired, bringing the ease of use a step closer to that of paper.

Another example of conventional information processing device, as disclosed by Japanese Patent Laid-Open No. 127714/1990, 15717/1992, and 15725/1992, employs a plurality of displays, each bonded with a tablet, through which information is input and output, to improve man-machine interface performance. Japanese Patent Laid-Open No. 278658/1992 discloses a system which consists of a plurality of liquid crystal display elements capable of both-side display, stacked together like a book, allowing the user to turn over the display elements like pages so that he or she can grasp the entire information in the same way as in a book.

In the above-mentioned conventional arts, the display and the tablet are physically integrated in construction and the relation between display and input is fixed. This construction has some drawbacks as it gives no considerations to the situations where the user may want to remove only a display and carry it freely; where the user may want to put the display at an arbitrary location on the desk (corresponding to the tablet or coordinate input device); or where the user may want to stack a plurality of displays together for a particular use.

In addition to the display and the tablet being integrated, the processing device is also a part of the integrated structure, giving rise to a limit to the reduction of weight and thickness. Further, when a plurality of displays are used, the cost is inhibitingly high.

SUMMARY OF THE INVENTION

The feature of this invention is summarized as follows. In an input-display integrated information processing system, which can be physically separated into a coordinate detection device for detecting information and a display for displaying the information and which allows the display to be located anywhere on the coordinate detection device; the system comprises a layout determining unit which determines a layout of the display on said coordinate detection device; the layout determining unit further comprises a display position coordinate detector that detects where in the coordinate space of the coordinate detection device the display for displaying an information is located; and a coordinate converter that converts the information into display coordinates.

With this invention, because the display and the coordinate detection device are separated, the display position coordinate sensing means first checks where in the coordinate space of the coordinate input device the display is located. Then, based on the check result of the display position coordinate sensing means, the layout sensing means checks to what degree the display is tilted with respect to a standard line in the coordinate input device, and which the front or back of the display is being used. Next, to display a handwriting coordinate detected by the coordinate input device at a position where the handwritten information has been entered, the input-to-display coordinate conversion means transforms the handwriting coordinate into a display coordinate according to the information from the layout sensing means and the display position coordinate sensing means. This processing is performed at all times so that the system grasps all dynamic behaviors of the display. This permits such operations as stacking a plurality of displays. Further, because the display can be separated from the coordinate input device and the processing device, a substantial reduction in thickness and weight can be achieved.

Another feature of this invention is a flat display device which has two sets of liquid crystal display stacked with an opaque sheet interposed therebetween, each consisting of a transparent electrode and a liquid crystal member. This flat display device also includes a controller arranged at its periphery which receives code information representing characters and/or figures entered and position information on these characters and/or figures and thereby performs control to display the characters and/or figures corresponding to the code information and the position information on the liquid crystal display.

DESCRIPTION OF THE PREFERRED EMBODIMENTS

One embodiment of the present invention is described by referring to FIGS. 1 to 17.

Figure 1:
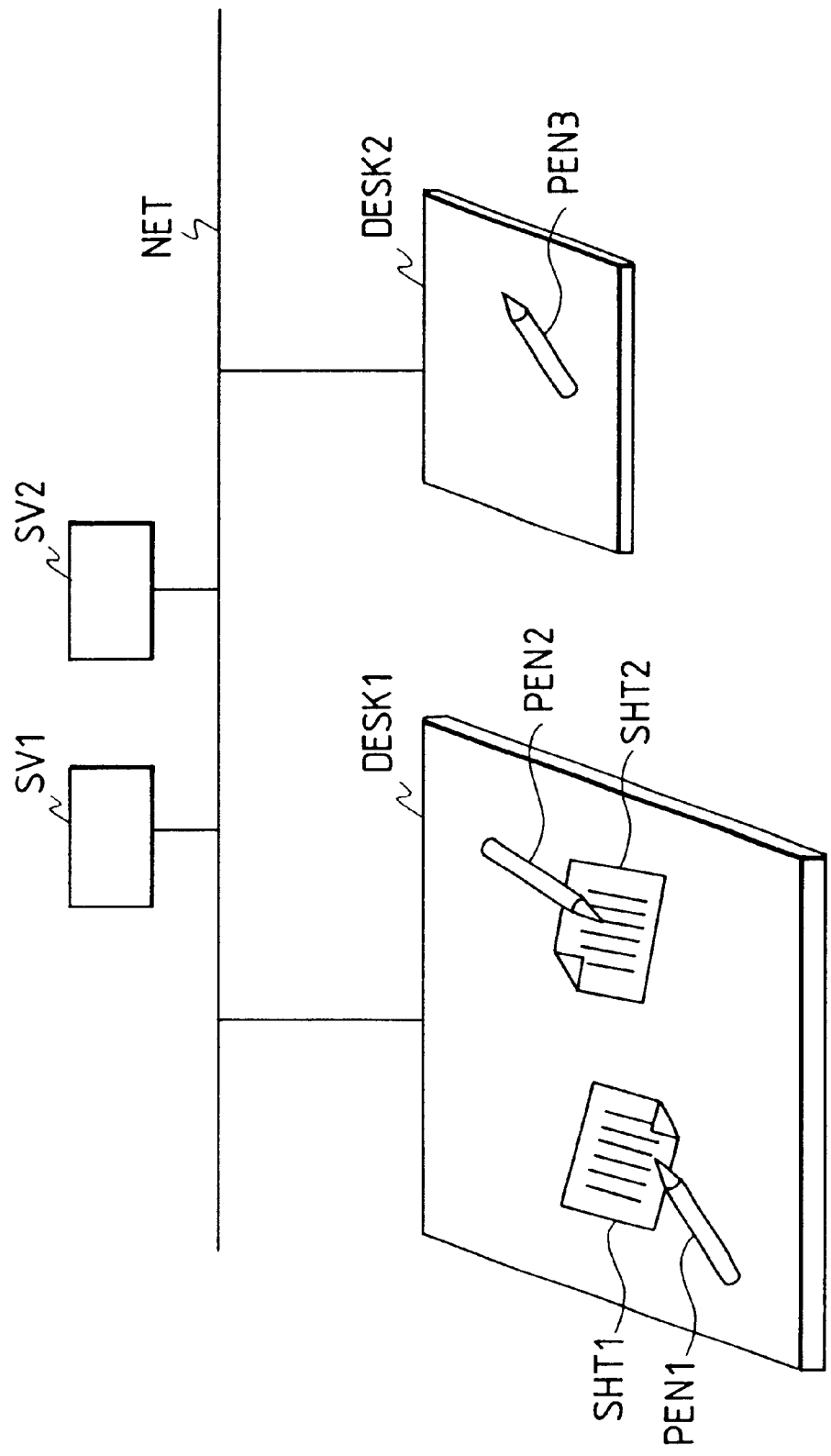
FIG. 1 is an overall external view of one embodiment of this invention.

FIG. 1 shows an overall external view of one embodiment of this invention.

The following description assumes that this embodiment is used in a network environment, that the display is physically separate from the coordinate input device and is cordless, that there are a plurality of flat displays (liquid crystal displays) and pens, and that one flat display has a front and a back screen.

Referring to FIG. 1, a network NET is connected with servers SV1, SV2 and pen-input information processing systems DESK1, DESK2 of this invention are taken as clients. Thus, an operator can freely utilize server resources from anywhere in the office. Among possible servers are an input/output device server for printer, scanner and facsimile, a large-capacity file server, a computing server that needs to have a CPU performance, and a network server that serves a network. It is possible to use this system as a single equipment without using the network. The pen-input information processing devices DESK1, DESK2 incorporate a coordinate input device TB that senses the coordinate of a stylus pen.

The pen-input information processing device DESK1, as shown in FIG. 1, has a plurality of flat displays SHT1, SHT2 (the number of displays may be one or three although two flat displays are shown), which are provided with two pens PEN1, PEN2 in this instance so that two or more people can work on the same desk. Examples of two or more persons using the same desk may include meetings and customer services at window. It is also possible to use two or more flat displays with only one pen.

If, when working on the pen-input information processing device DESK1, the flat displays SHT1, SHT2 are carried onto another pen-input information processing device DESK2, the similar work environment can be obtained. For this purpose, the network server (SV1 or SV2) must be able to discriminate between the flat displays SHT1, SHT2 and serve the same environment as the pen-input information processing device DESK1. The coordinate input device of the pen-input information processing device DESK2 may use the stylus pen PEN1 or PEN2 or another pen PEN3. In this case, the coordinate input device must be able to identify each of the pens PEN1–PEN3, which are unique. An example method of uniquely identifying the pens PEN1–PEN3, as disclosed in Japanese Patent Laid-Open No. 11916/1993, utilizes the difference of their resonance frequencies that are generated by coil and capacitor. Further, the system senses the removal and mounting of the flat displays SHT1, SHT2 to and from the pen-input information processing device DESK1 to save and recover the work environment. This allows an operator to immediately start his or her work simply by placing the flat displays SHT1, SHT2 on the pen-input information processing device DESK1, substantially improving the man-machine interface. Because the pen is of an electromagnetic type, a signal of the pen PEN1 passes through the flat display SHT1, SHT2 (in the example of FIG. 1) so that the coordinate of the pen can be detected. Once the pen coordinate is detected, handwriting input can be made as well as conventional menu and icon specification.

Figure 2:
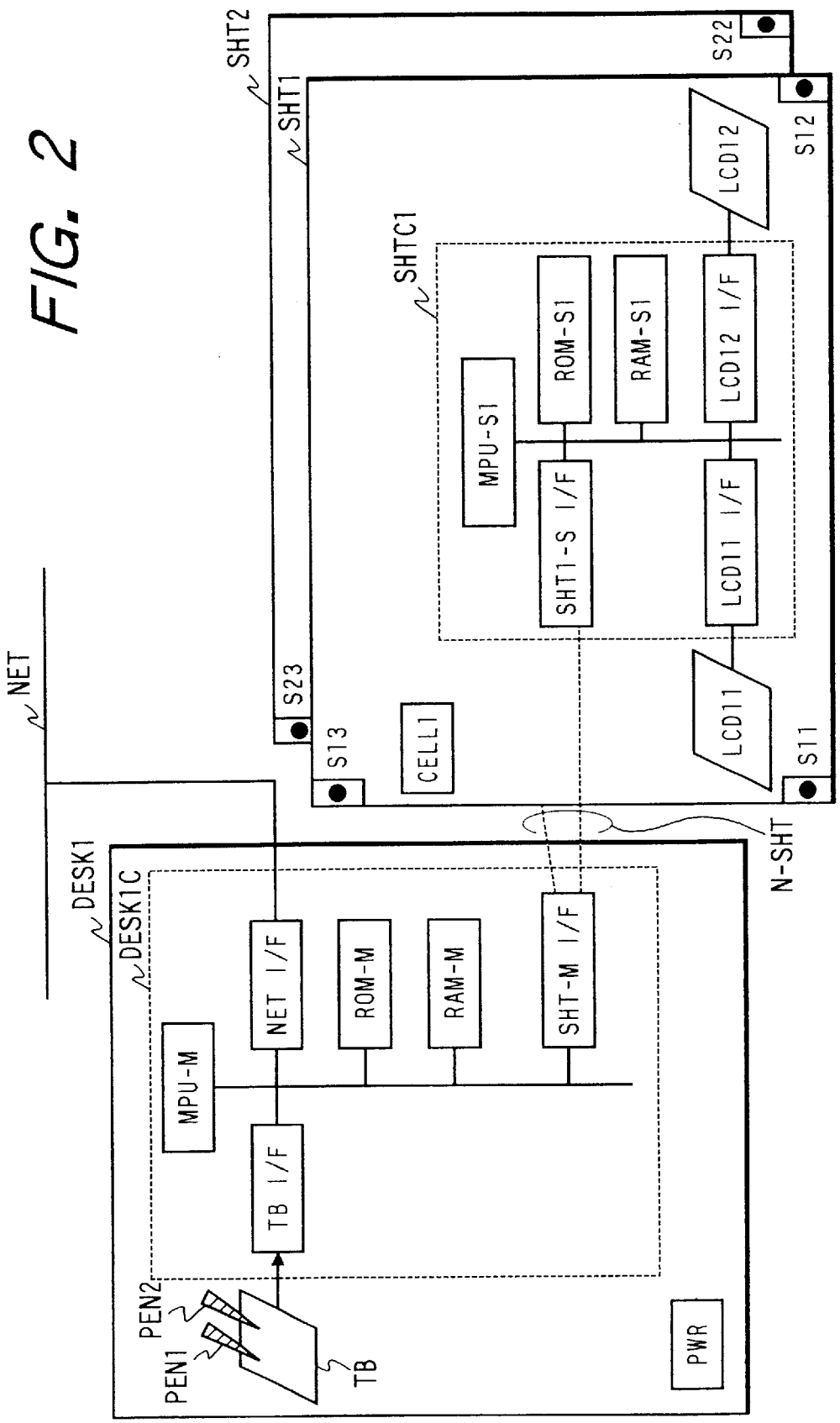
FIG. 2 is a block diagram showing the configuration of the embodiment of the invention.

Next, by referring to FIG. 2, a block configuration of one embodiment of this invention (a case of pen-input information processing device DESK1) is described. The pen-input information processing device consists largely of a processing device DESK1 (with a built-in coordinate input device) and two flat display sheets SHT1, SHT2. Information is transferred between the processing device DESK1 and the two flat display sheets SHT1, SHT2 without using a cord. The flat display sheets SHT1, SHT2 each incorporate a sheet controller SHTC1 (SHTC2 not shown), and thus information exchange between the processing device DESK1 and the display is performed by using code data via cordless interface circuits SHT-M I/F, SHT1-S I/F.

The processing device DESK1 comprises a desk controller DESK1C that performs an overall control, a coordinate input device TB, and stylus pens PEN1, PEN2. The coordinates of the stylus pens PEN1, PEN2 are taken in through an interface TB I/F into the desk controller DESK1C for processing. The desk controller DESK1C is assumed to have the same processing capability and functions as the latest pen computers and notebook personal computers. Hence, it includes a microprocessor MPU-M, memories (ROM-M, RAM-M), an interface NET I/F with external circuits, and a power supply PWR.

The flat display SHT1 consists of a sheet controller SHTC1, two liquid crystal displays LCD11, LCD12, and a battery CELL1 (flat display SHT2 also has the same configuration). Because there are a front and a back display, the both sides of the flat display can be used like a sheet of paper. The contents displayed are kept from disappearing by the internal battery. The sheet controller SHTC1 has a function to convert code data of characters and drawings into image information and, like the desk controller DESK1C, includes a microprocessor MPU-S1, memories (ROM-S1, RAM-S1), interfaces with LCD LCD11 I/F, LCD12 I/F, and an interface SHT1-S I/F with the desk controller DESK1C. To determine the layout of the flat display SHT1, such as its inclination and whether the front or back is being used, markers S11, S12, S13 are embedded in the corners of the display. The marker positions are detected by the coordinate input device TB.

Next, the operation and manipulation of the pen-input information processing device of FIG. 2 is explained. The markers S11, S12, S13 of the flat display SHT1, as described in Japanese Patent Laid-Open No. 11916/1993, consists of a coil and a capacitor. By utilizing the physical phenomenon that the coil-capacitor element resonates at a particular frequency, it is possible to detect the coordinates of the markers and their identifications. That is, the coordinate input device TB supplies particular frequencies to X- and Y-axis sensor of TB, senses the energy at which the markers resonate, and calculates the coordinates of the markers. The coordinates of the stylus pens can also be detected in the similar way. The resonating frequency of the stylus pen PEN1 and the resonating frequencies of the markers S11, S12, S13 need to differ from each other so that the pen and the markers can be uniquely identified. The coordinate of the stylus pen PEN1 or PEN2 is entered through the interface TB I/F into the microprocessor MPU-M, which performs corresponding processing.

Next, how the information is processed by the pen-input information processing device DESK1 is displayed on the display sheet SHT1 will be explained. First, the coordinate data of the coordinate input device TB is taken in through the TB I/F and is displayed, through the sheet interfaces SHT-M I/F, SHT1-S I/F, as a collection of coordinate points on the liquid crystal display LDC11 or LCD12 of the flat display SHT1. Character and drawing information generated by the pen-input information processing device DESK1 is transformed into code information, which is then transferred, along with information on position where they are to be displayed, to the flat display SHT1. The flat display SHT1 translates the code information and position information received into character font data (stored in ROM-S1) and drawing images, and stores them in the display memory ROM-S1. The data in the display memory is cyclically displayed through the liquid crystal display interface LCD11 I/F or LCD12 I/F on the liquid crystal display LCD11 or LCD12. Further, a variety of information supplied through the network NET from higher systems are taken in through the interface NET I/F and then transferred to the flat display SHT1 for display. As mentioned earlier, because the flat display in this configuration of the invention incorporates memories, the contents of display can be viewed while the display is carried.

In this embodiment, as mentioned above, the desk controller DESK1C that mainly performs information processing and the sheet controllers SHTC1-SHTC2 that mainly perform display processing combine to form a multi-processor configuration. This improves the processing performance, simplifies the interface, and provides greater flexibility because of the display's independence from the pen-input information processing device. As another example of this invention, it is possible to stick the flat display on the front surface of a partition in the office with a clip or magnet for displaying information. Further, data communication may be performed from the pen-input information processing device to change the displayed contents. In this case, however, commands cannot be directly entered into the display. (Only when the flat display is put on the desk, can the command or information be entered.)

Figure 3:
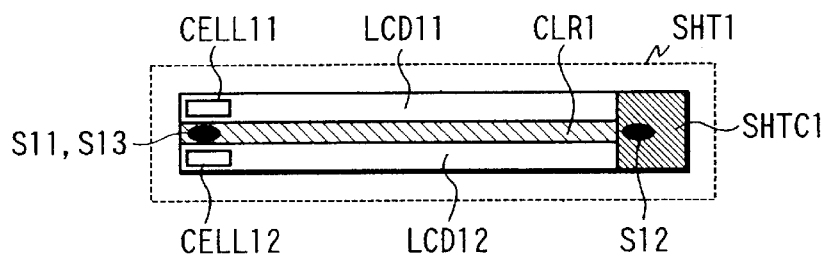
FIG. 3 is a schematic cross section showing the structure of a flat display sheet.

FIG. 3 shows the construction of the flat display SHT1 (same applies to SHT2). The flat display SHT1 has two liquid crystal displays LCD11, LCD12 bound together with an opaque color sheet CLR1 interposed therebetween to realize a both-side display (display on both front and rear sides). In the flat display, transparent electrodes form segments and apply a potential to liquid crystals to produce an image by utilizing a phase difference of the liquid crystals with respect to a polarizing plate. Therefore, if two liquid crystal displays are merely stacked together, the effects of an image of the other side will show on the display. For this reason, a separating opaque sheet CLR1 is disposed between the two LCD displays. The flat display SHT1 incorporates batteries CELL11, CELL12 as power supplies for the displays and a sheet controller SHTC1 for controlling the display. The batteries CELL11, CELL12 are a combination of a photocell and a secondary battery, and have a battery capacity large enough to display the display information. If wires are used, the battery can be eliminated because power can be supplied from the desk. The sheet controller SHTC1 is mounted in the peripheral portion of the flat display SHT1, considering a possible degradation of reliability caused by deflection. If the sheet controller SHTC1 is mounted in a film-like sheet, as realized with the wrist watches and pocket calculators, the ease of use of the display is further improved, approaching that of paper. To determine the positional relation (amount of movement and rotation) of the flat display SHT1 with respect to the coordinate input device, the flat display SHT1 is provided with markers S11, S12, S13 at its corners.

Figure 4A:
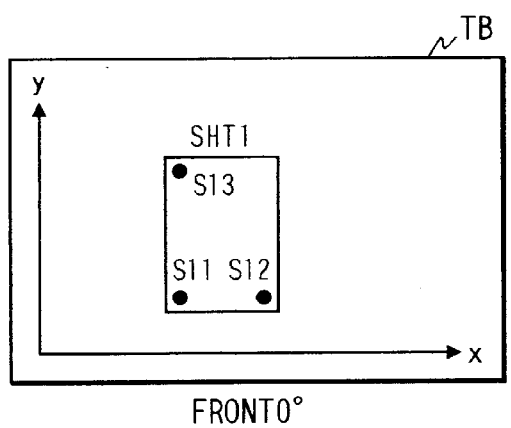
FIG. 4A is an example layout of the display of the embodiment of the invention.
Figure 4B:
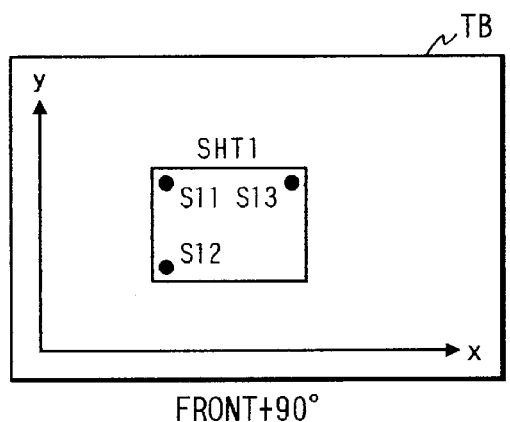
FIG. 4B is another example layout of the display of the embodiment of this invention.
Figure 4C:
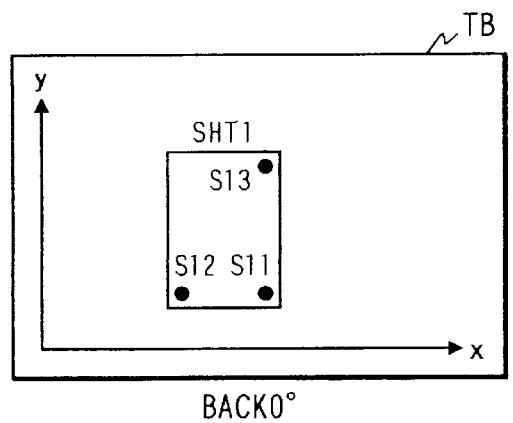
FIG. 4C is another example layout of the display of the embodiment of this invention.
Figure 4D:
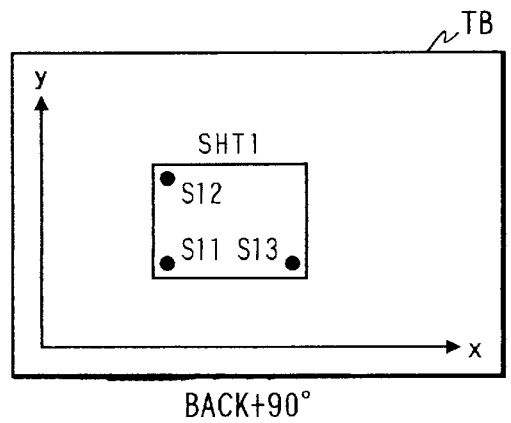
FIG. 4D is another example layout of the display of the embodiment of this invention.

Next, the positional relation between the marker positions and the flat display SHT1 is described with reference to FIGS. 4A to 4D. As shown in these figures, the flat display SHT1 is physically separate from the coordinate input device and thus can be placed at any desired position on the coordinate input device TB. Further, because the flat display SHT1 can produce images on both sides, it can be turned upside down. FIG. 4A represents a case where the display's front side shows and its inclination is 0 degree (FRONT 0°), FIG. 4B represents a case where the display shows the front side and its inclination is +90° (clockwise direction is taken as +) (FRONT 90°), FIG. 4C represents a case where the display shows the back side and its inclination is 0° (BACK 0°), and FIG. 4D represents a case where the display shows the back side and its inclination is 90° (BACK 0°). In reality, however, the display is rarely positioned at a 90° inclination but usually put randomly at an arbitrary angle and position.

Figure 5:
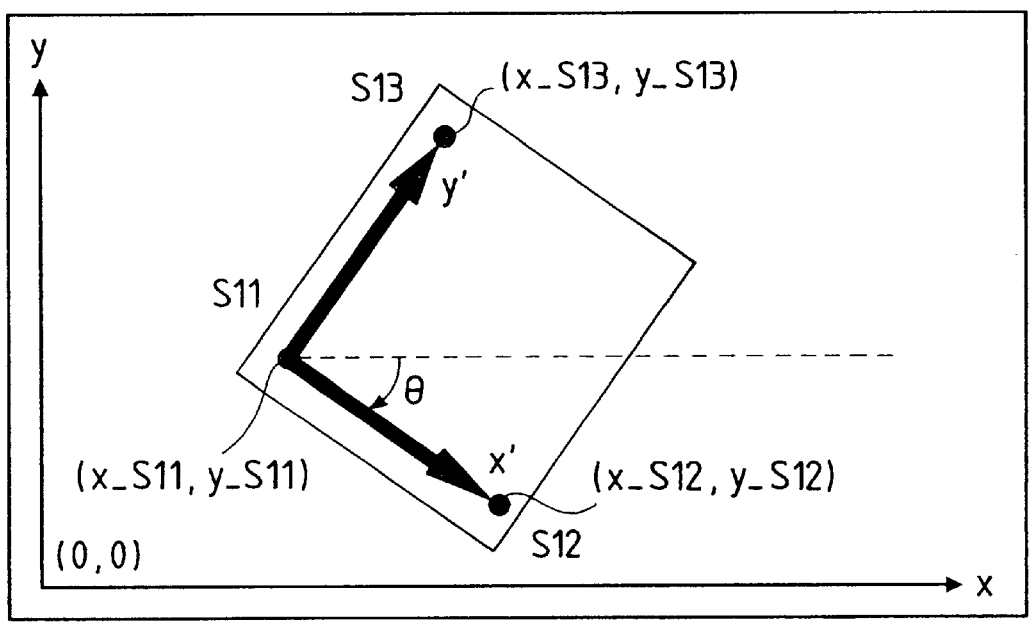
FIG. 5 is a schematic diagram showing the conversion from the TB coordinate system to the flat display coordinate system.

FIG. 5 explains the coordinate conversion when the flat display SHT1 is placed at an arbitrary position on the coordinate input device TB. TB's coordinate system has x and y axes and the SHT1's coordinate system has x' and y' axes, with their origins located at the lower left. The markers S11, S12, S13 are located at coordinates (x_S11, y_S11), (x_S12, y_S12), and (x_S13, y_S13), as shown. With respect to the TB coordinate system, the SHT1 coordinate system is displaced to the coordinate of the marker S11 and rotated by an angle θ in the + direction. Thus, when the coordinates entered from the TB are to be located on the flat display SHT1, this coordinate conversion must be performed. The angle of rotation θ can be determined easily from the coordinates of the markers S11, S12 (detail will be given later).

Figure 6A:
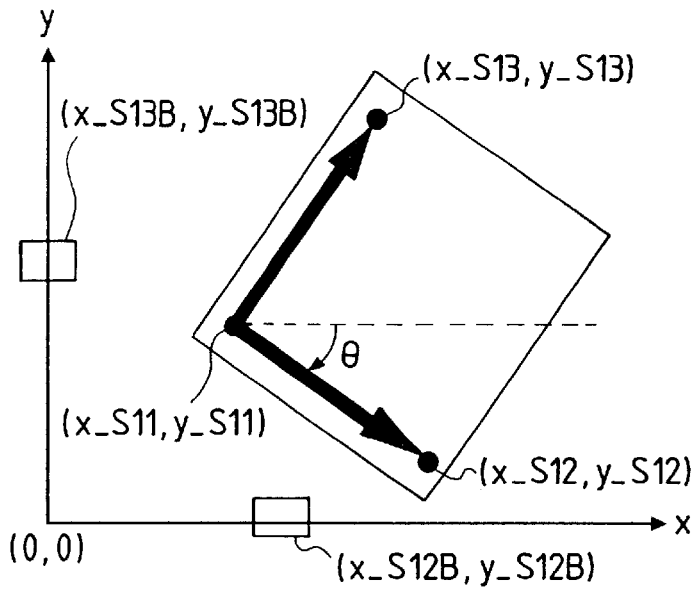
FIG. 6A is a schematic diagram showing how it is decided whether the front or back of the display is being used.
Figure 6B:
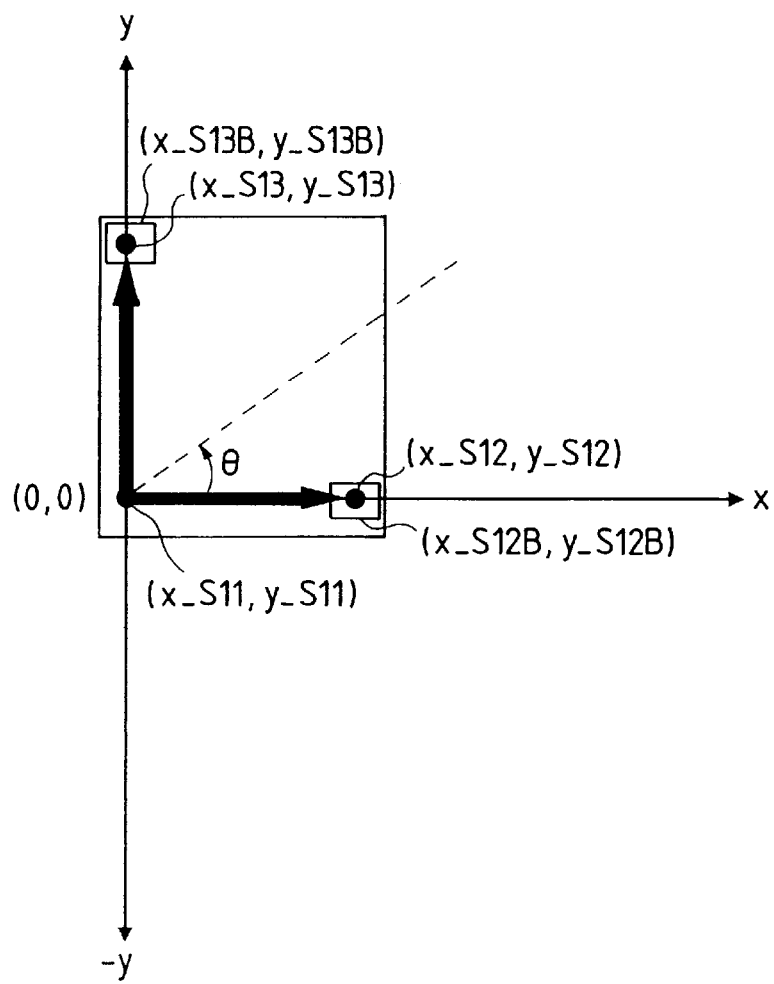
FIG. 6B is a schematic diagram showing how it is decided whether the front or back of the display is being used.
Figure 6C:
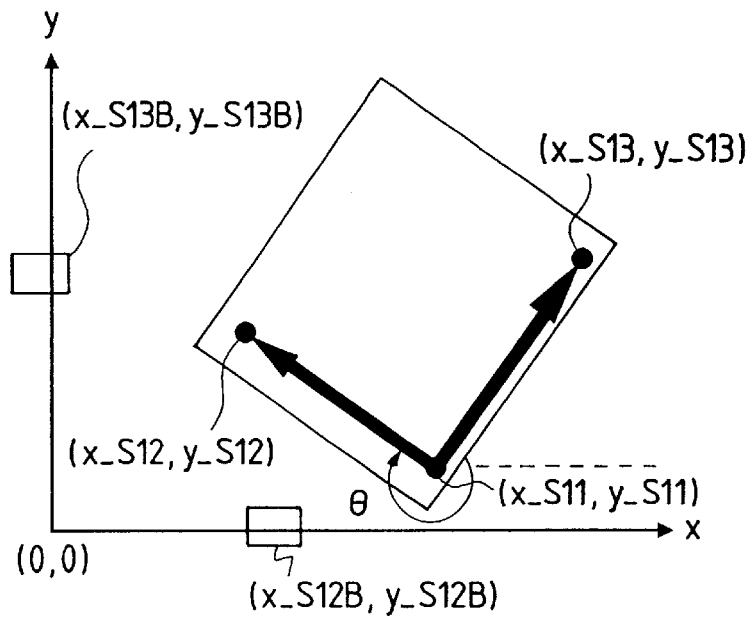
FIG. 6C is a schematic diagram showing how it is decided whether the front or back of the display is being used.
Figure 6D:
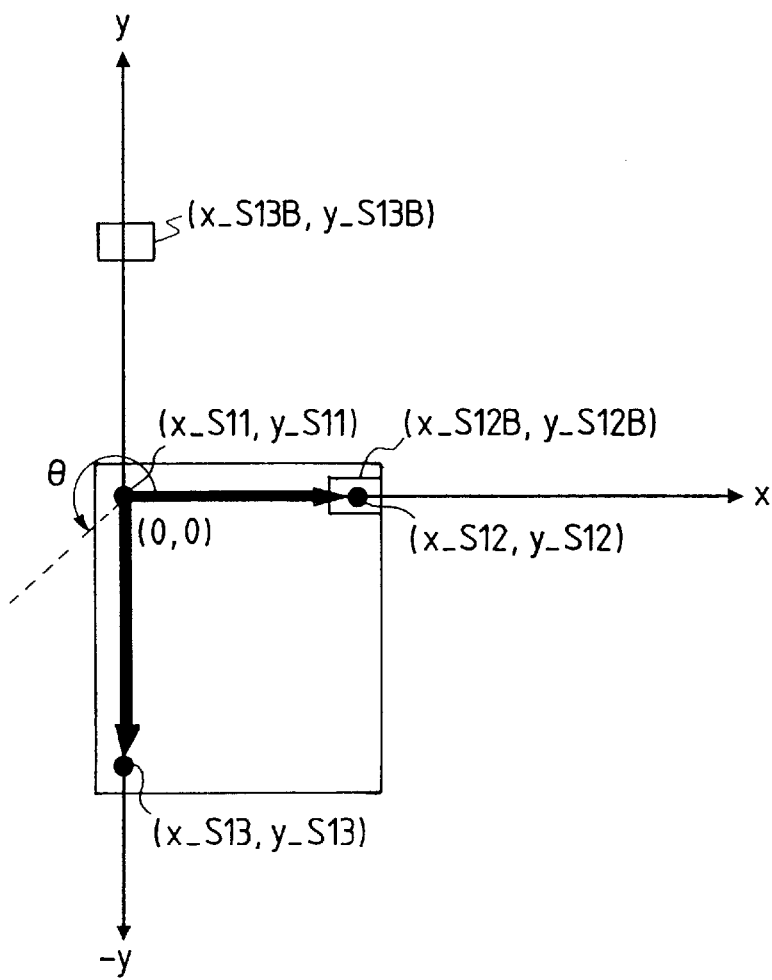
FIG. 6D is a schematic diagram showing how it is decided whether the front or back of the display is being used.

FIGS. 6A to 6D explain the method of determining which of the front and back of the flat display SHT1 is being used. The front/back decision can be made by newly adding the coordinate of a marker S13. That is, the coordinate of the marker S11 (x_S11', y_S11') is moved to the origin of the TB coordinate system, and the SHT1 coordinate system is rotated until the coordinate of the marker S12 (x_S12', y_S12') reaches a specified base position (x_S12B, y_S12B). A check is made to see if the coordinate of the marker S13 (x_S13', y_S13') is located at a specified base position (x_S13B, y_S13B), thus making the front/back decision. FIG. 6B shows the result of performing the displacement and rotation processing on the flat display SHT1 put in a state shown in FIG. 6A. In this case, because the coordinate of the marker S13 (x_S13', y_S13') is at the specified base position (x_S13B, y_S13B), it is decided that the front side shows. FIG. 6D shows the result of performing the displacement and rotation processing on the flat display SHT1 put in a state shown in FIG. 6C. In this case, the coordinate of the marker S13 (x_S13', y_S13') is not located at the specified base position (x_S13B, y_S13B) and it is decided that the back side shows.

Figure 7A:
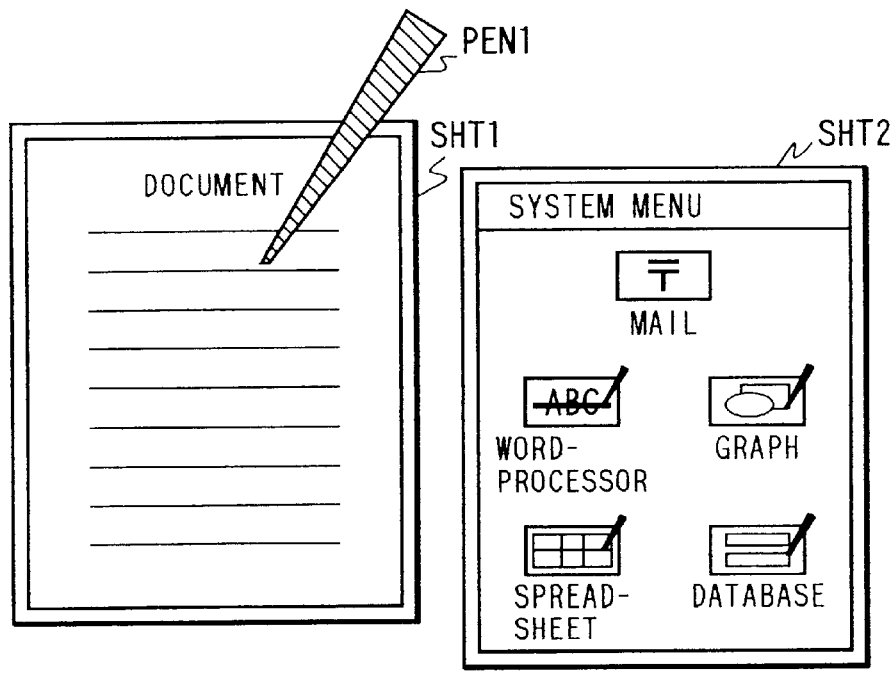
FIG. 7A shows an example of system management using a plurality of displays.
Figure 7B:
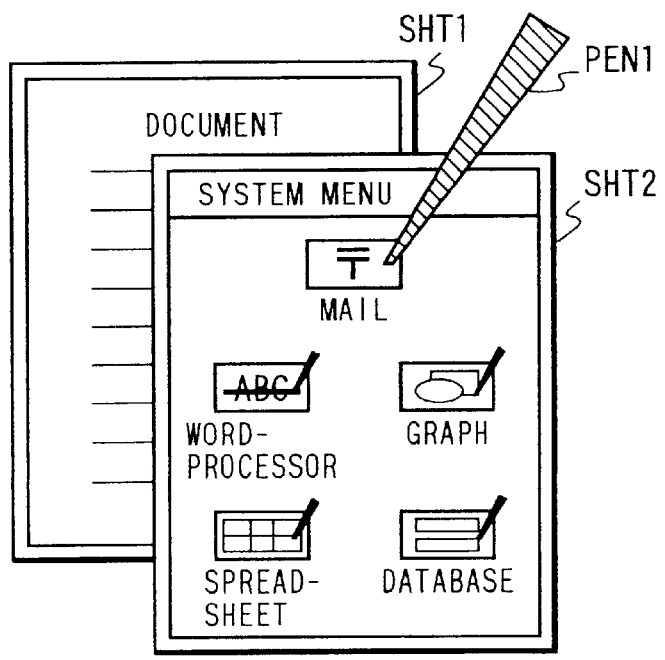
FIG. 7B shows another example of system management using a plurality of displays.

Next, the operation of physically stacking a plurality of displays, one of the features of this invention, will be described by referring to FIGS. 7A and 7B. FIGS. 7A and 7B represent a case where the invention is applied to system management. Although this embodiment uses two sheet displays, more sheet displays can be used. If two flat displays SHT1, SHT2 are provided, the flat display SHT1 may be assigned to work and the other flat display SHT2 to a system management, greatly enhancing the flexibility and ease of use. In the conventional system, one screen is divided into multiple windows, which necessarily reduces the window size and results in many overlaps between windows. This situation makes the multiple windows very awkward to use, far from the level of flexibility the paper offers. The present invention eliminates this drawback by using a plurality of flat displays, allowing an operator to use the displays in much the same way as he would sheets of paper. In FIG. 7A, the flat display SHT1, in this instance, is used for preparing a document by using a word processor function (it is assumed that the flat display SHT1 is already assigned a word processor function before starting the work). When one wishes to mail the document to other person (via facsimile), he or she simply stacks the system management display SHT2 on the first display, as shown in FIG. 7B, and picks the icon of mail with a pen. This permits document mailing as with the conventional system. Similarly, a variety of application software (graph generation, table calculation, database, etc.) can be assigned to the work display SHT1 and managed by the system management display SHT2. In the example of FIG. 7A and 7B the system menu (a plurality of functions) is assigned to one display. If, however, the display has only one function (facsimile function, for instance), there is no need to specify the function with a pen and simply stacking the function display on the work display enables facsimile transmission or reception. By assigning an attribute to each flat display and managing the attributes in this way, the displays can be used as ones with a dedicated function, greatly improving the work environment.

Figure 8:
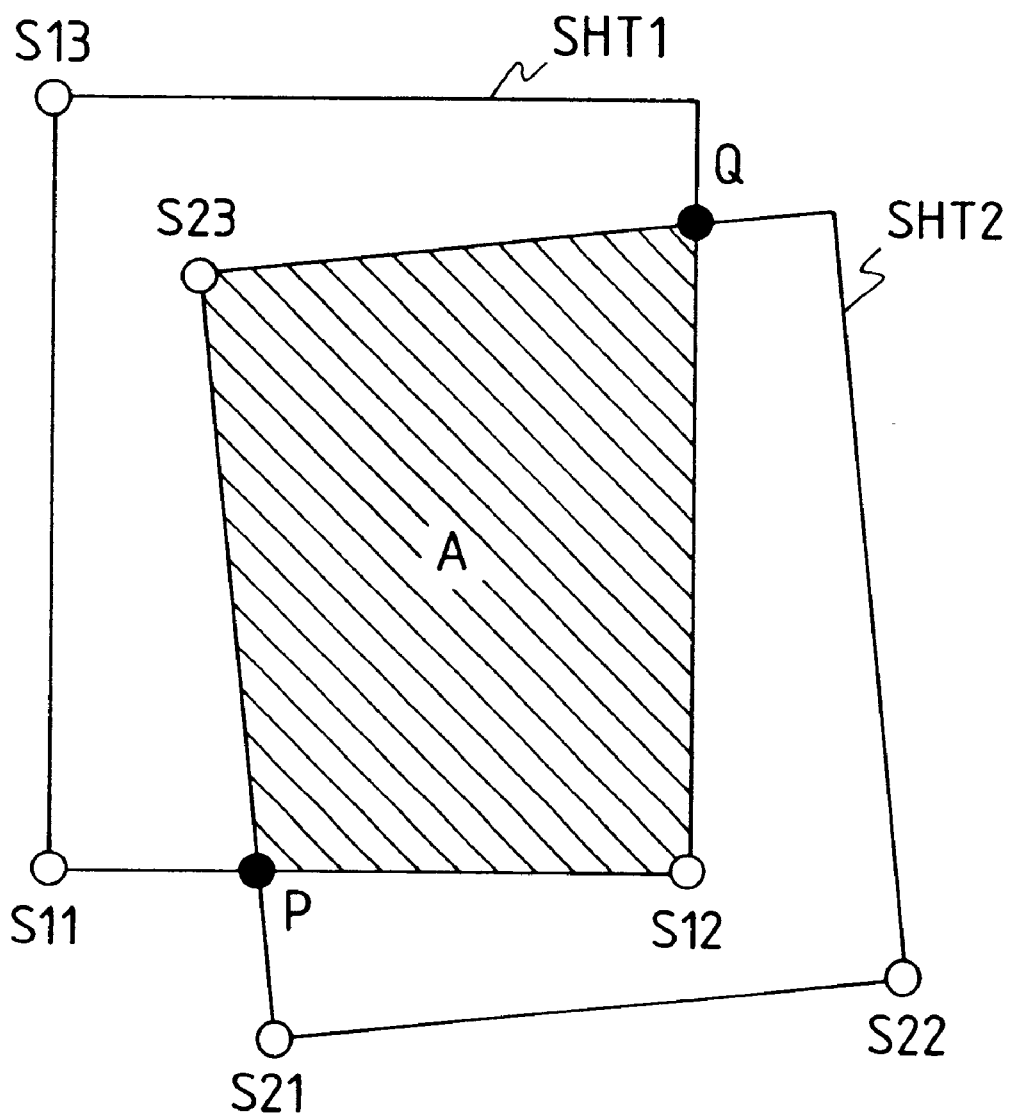
FIG. 8 is a schematic diagram showing how the degree of overlap between a plurality of displays is determined.

If the fundamental operation consists in stacking a plurality of flat displays, it is necessary to prevent erroneous stacking as the number of flat displays increases. For this purpose, it is preferred that an overlapping area A be calculated and compared with a threshold value as shown in FIG. 8. The overlapping area can be calculated easily from the markers' coordinates and the coordinates where the sides of the two displays cross each other. When displays are stacked together, which of the displays is on the other cannot be known from the markers' coordinates alone. Therefore, in this invention the stacking operation requires the operator to lift the display slightly and place it again on other display. The display that detects this action is recognized as being the topmost. Other possible methods of determining the stacking order include one that uses a coordinate input device that can sense the height direction of coordinate, and one which arranges optical sensors at the corners of the display and determines the stacking order from the presence or absence of signals from the sensors.

Figure 9:
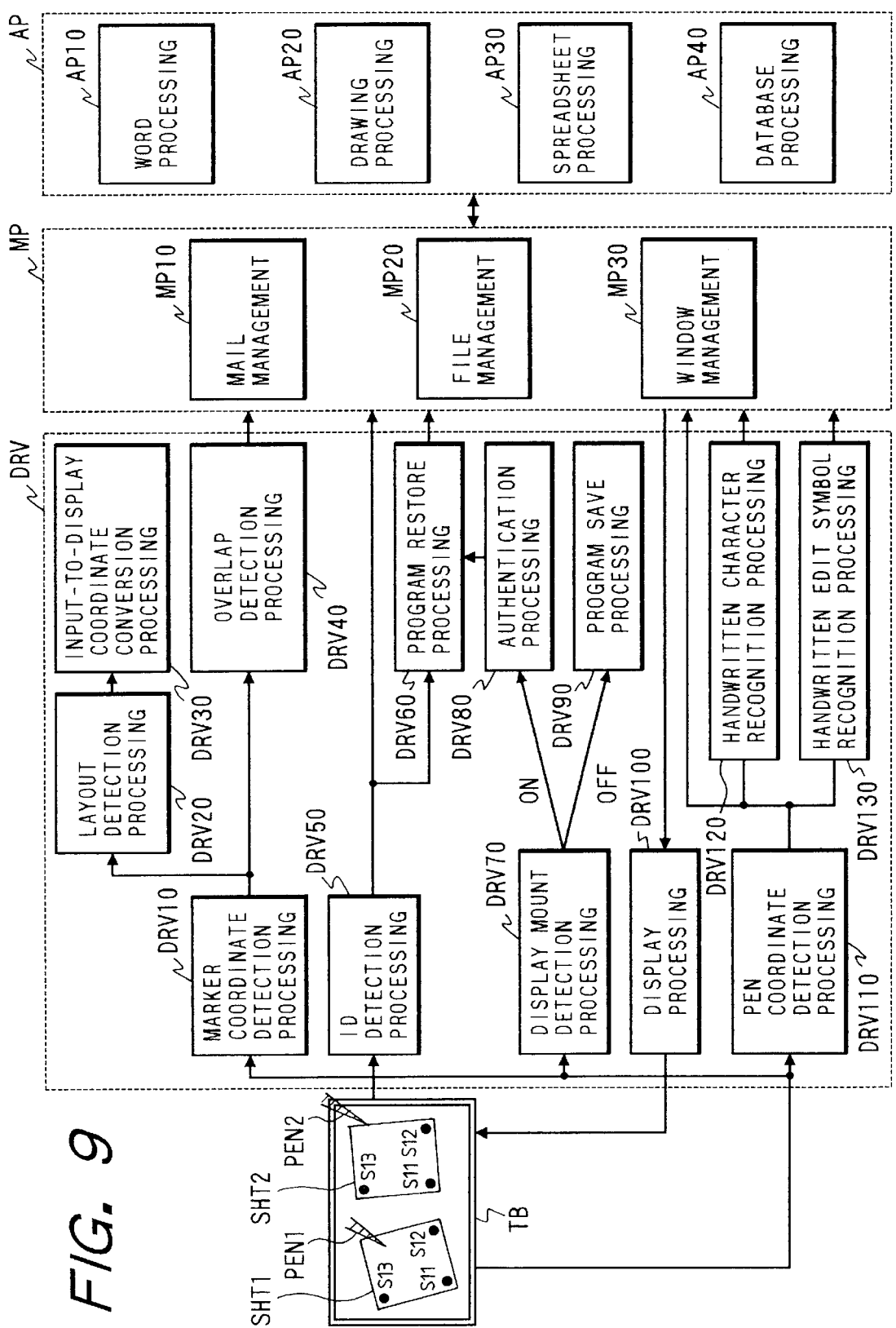
FIG. 9 is a block diagram showing the software configuration of the embodiment of this invention.

Next, the software configuration in this embodiment is described by referring to FIG. 9. In this figure, software consists largely of a driver software DRV, a middle software MP and application software AP. In the server configuration shown in FIG. 1, a variety of functions may be used and thus the explanation on the functions referring to FIG. 9 is omitted in the following description. They will be explained as required.

First, let us turn to the driver software DRV. Programs DRV10–DRV90 are running at all times to monitor the relation of the display with the coordinate input device, continuously checking display behaviors such as separation, mounting and inclination actions, and performing necessary processing. Signals from the markers S11–S13 and from the stylus pens PEN1, PEN2 are processed by the coordinate input device TB to determine their coordinates. The coordinate data are fed to a display arrangement (marker) coordinate detection processing DRV10, a layout detection processing DRV20 and a pen coordinate detection processing DRV110.

The output data from the display arrangement (marker) coordinate detection processing DRV10 is supplied to the layout detection processing DRV20 and an overlap detection processing DRV40 to determine the arrangement and overlapping condition of the flat displays. The arrangement data (inclination angle, displacement and use of front or rear LCD) is processed by an input-to-display coordinate conversion processing DRV30 and used for displaying handwriting and for pointing displayed objects. The overlapping condition is used by the middle software MP for system management (mailing and file management).

An ID detection processing DRV50 is a processing to detect identification information unique to the flat displays SHT1, SHT2 by taking in (predefined) IDs stored in the memory of the flat displays SHT1, SHT2. Only when three conditions are met—ID is detected, display mount information becomes turned ON and the result of a authentication processing DRV80 is correct—is the program, which was saved, restored by a restore processing DRV60, allowing the operator to enter into the environment in which the previous processing was being performed. Normally, this function is identical with what is called a resume function which, at turning power on, brings the system to the previous state (before power was turned off). If, when the flat display is moved to other desk, the ID and the program restore processing fail to match, this is informed to the server, which then downloads the correct environment. This function is executed by the network server.

The coordinate data of the pen coordinate detection processing DRV110 is converted into character codes and edit command codes by a window management MP30, a handwritten character recognition processing DRV120 and a handwritten editing symbol recognition processing DRV130. Handwriting and characters are processed by a display processing DRV100 and converted into image data.

The application software AP includes, as shown in the figure, a word processing AP10 for generating a document, a drawing processing AP20 for drawing figures, a spreadsheet processing AP30 for calculating numerical data, and a database processing AP40 for database search and file generation. Any further application software can be used.

By referring to FIGS. 10 to 17D, the driver software DRV of FIG. 9, a feature of this invention, will be explained.

Figure 10:
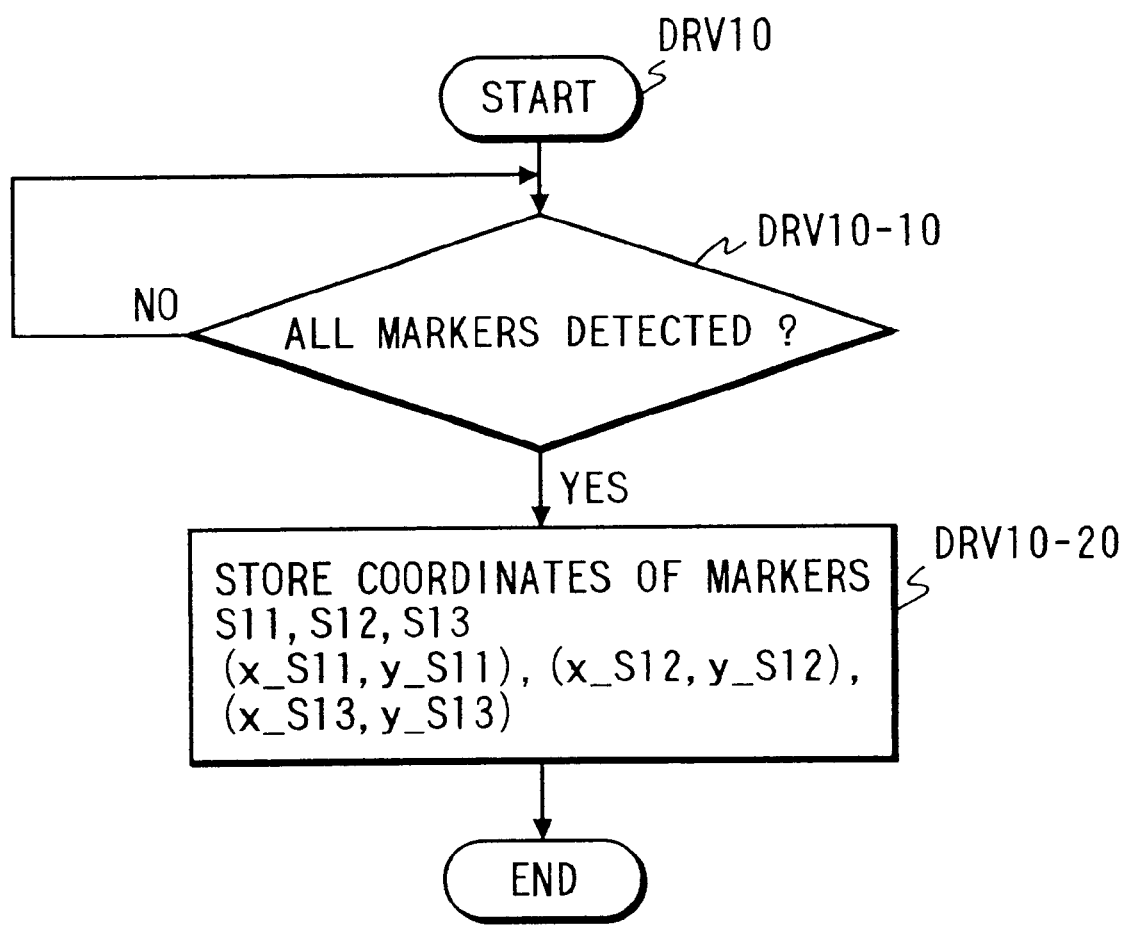
FIG. 10 is a marker coordinate detection processing flow in the embodiment of the invention.

FIG. 10 shows a flow of the marker coordinate detection processing DRV10. In the figure, the marker coordinate detection processing DRV10 outputs the marker coordinates only after all the markers are detected in order to avoid an unstable state that occurs when the flat display begins to be mounted on the coordinate input device TB.

Figure 11:
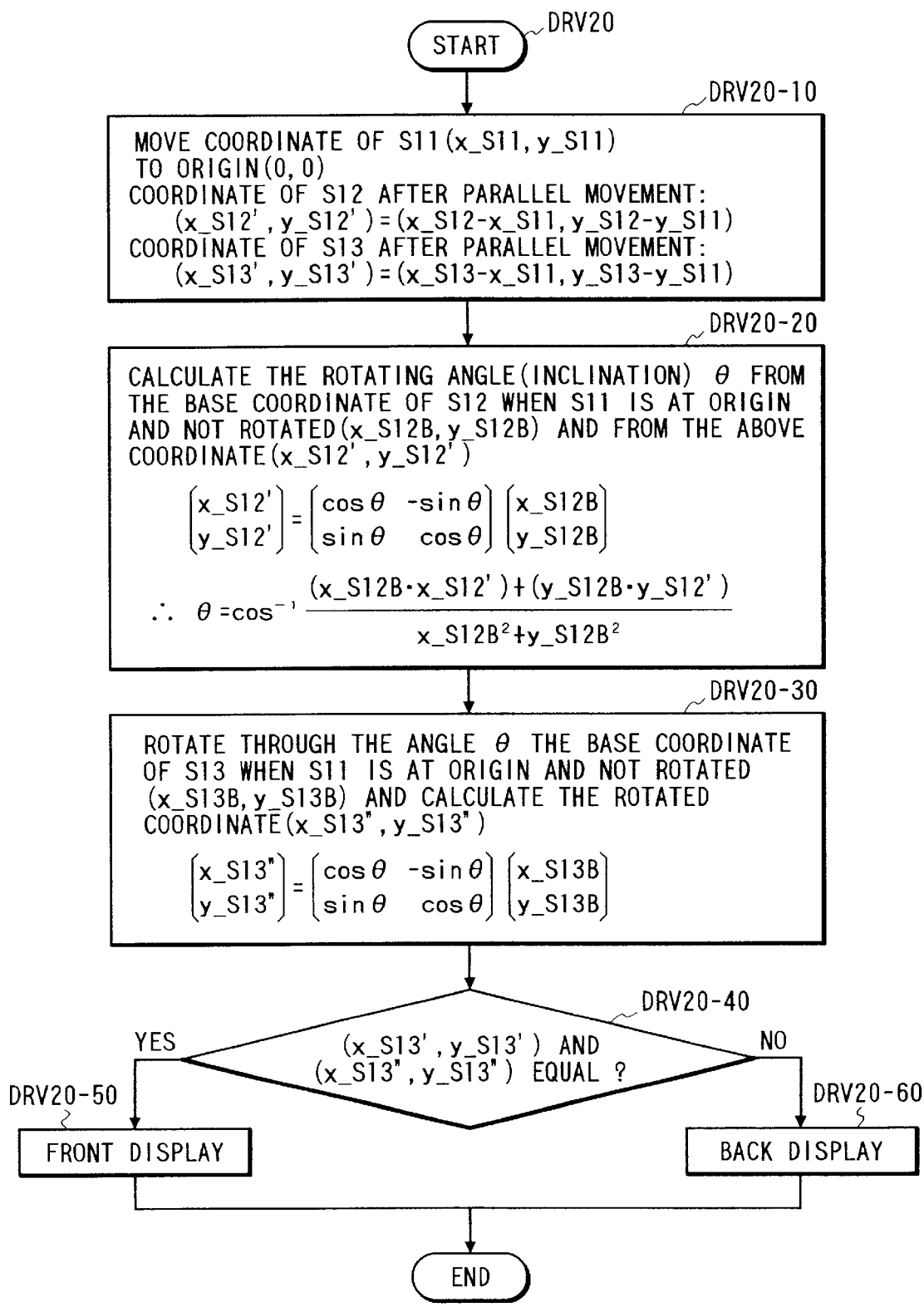
FIG. 11 is a layout detection processing flow in the embodiment of the invention.

FIG. 11 shows a flow of the layout detection processing DRV20. First, the coordinate of the marker S11 is moved parallelly to the origin of TB without being rotated (step DRV20-10). Next, the angle of rotation θ is calculated, as shown in step DRV20-20, from the base coordinate of the marker S12 (x_S12B, y_S12B) and the S12 coordinate (x_S12', y_S12') after parallel displacement. The base coordinate is a coordinate when the inclination is zero. Next, after the inclination angle θ is calculated, the base coordinate of the marker S13 is rotated through θ and the coordinate at this time is taken as (x_S13", y_S13") (step DRV20-30). Finally, a comparison is made between the coordinate of the marker S13 after parallel displacement (x_S13', y_S13') and the base coordinate after rotation (x_S13", y_S13") (step DRV20-40). If they agree, it is decided that the front side of the display is being used. If not, the back side is used.

Figure 12:
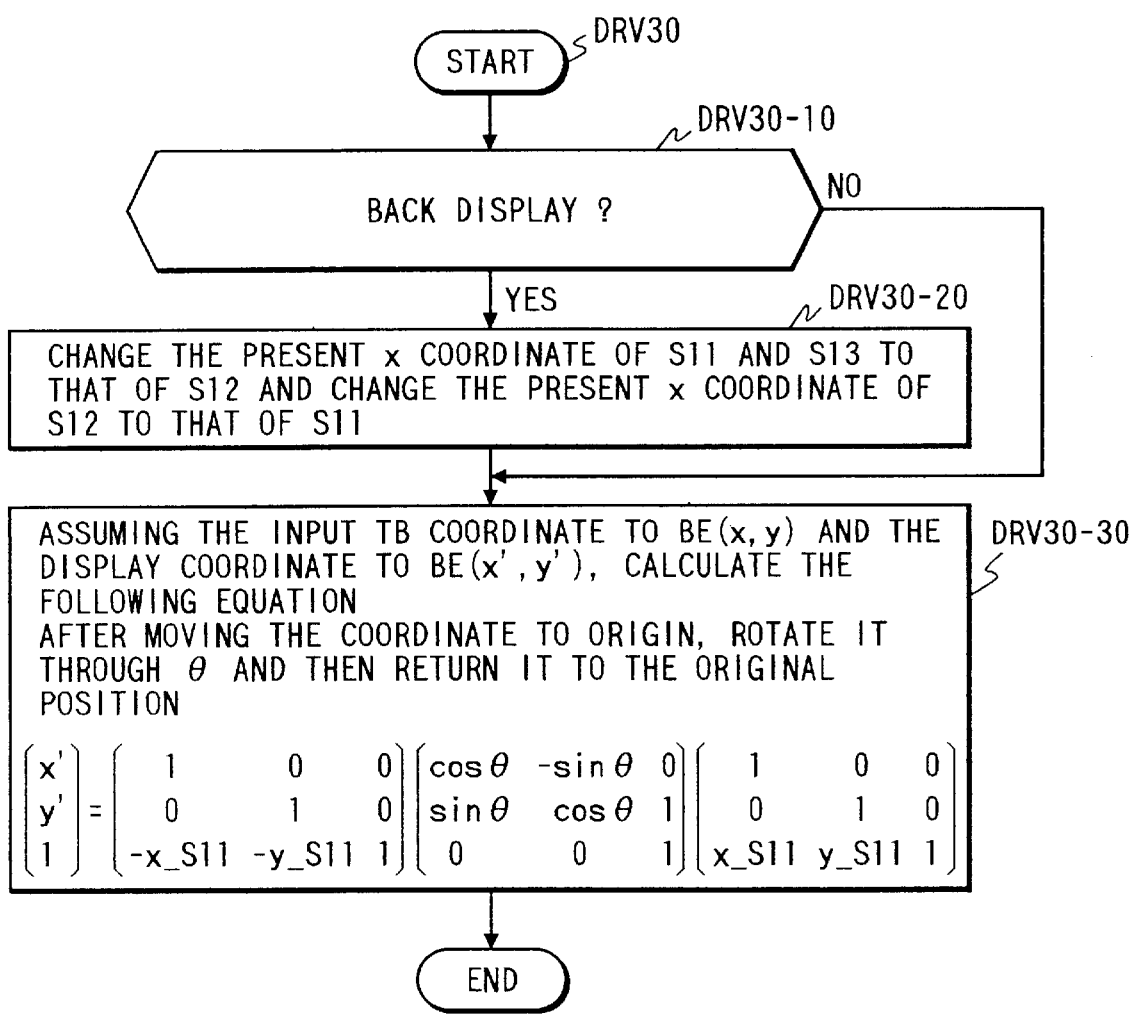
FIG. 12 is an input-to-display coordinate conversion processing flow in the embodiment of the invention.

FIG. 12 shows a flow of the input-to-display coordinate conversion processing DRV30. This flow converts the TB coordinate system to the flat display coordinate system. First, a check is made as to whether the front or back of the display is being used. If the back is used, the coordinate is changed (step DRV30-10, DRV30-20). Next, as shown in step DRV30-30, the TB coordinate entered is converted into the display coordinate. As a result, the input position and the display position agree, allowing drawings to be displayed and pointing to be performed.

Figure 13:
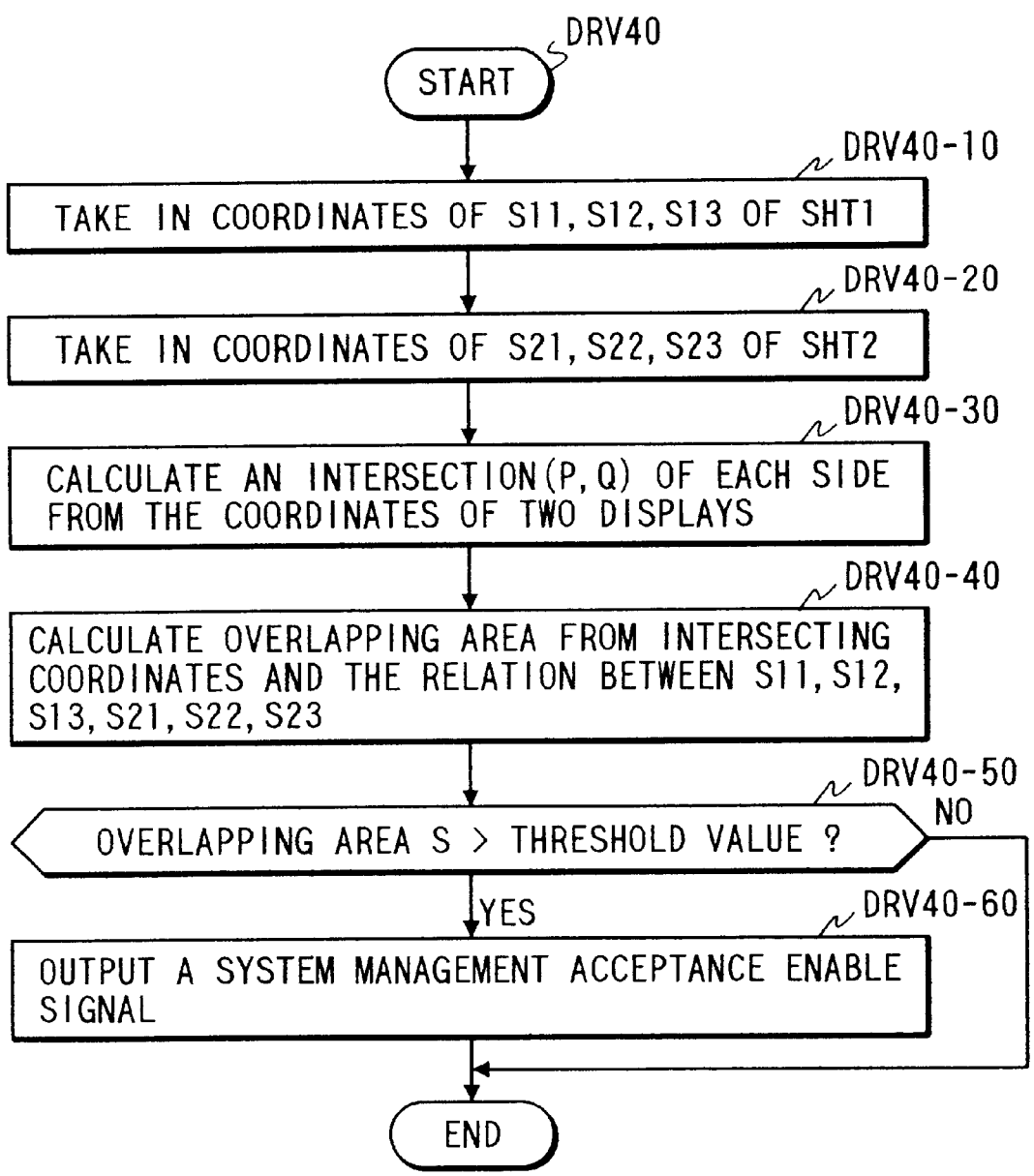
FIG. 13 is an overlap detection processing flow in the embodiment of the invention.

FIG. 13 is a flow of the overlap detection processing DRV40. First, the marker coordinates of the flat displays SHT1, SHT2 are taken in (step DRV40-10, DRV40-20). Next, by using two displays' coordinates, an intersection coordinate of each side is calculated (step DRV40-30). From the intersection coordinates and the marker coordinates, an overlapping area A is calculated (step DRV40-40). Finally, when the overlapping area A is greater than the specified threshold value, a system management enable signal is output (step DRV40-50, DRV40-60). The presence of this system enable signal and of menu or icon specification results in an operation of the system (e.g., copying or mailing of a file).

Figure 14:
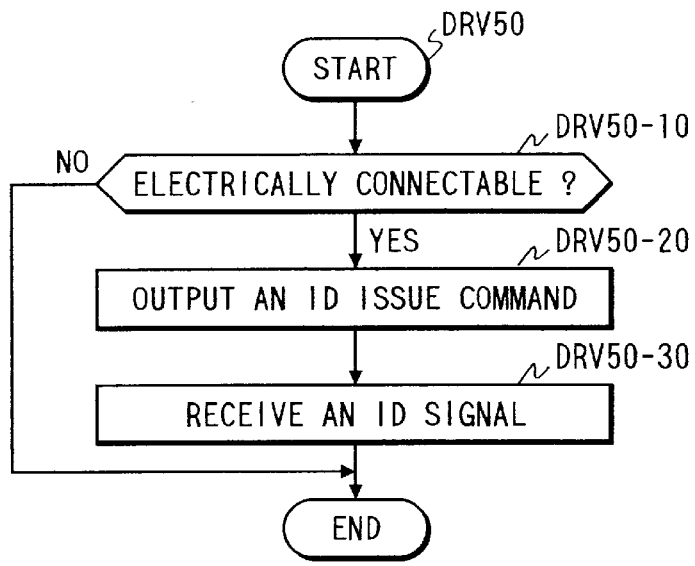
FIG. 14 is an ID detection processing flow in the embodiment of the invention.

FIG. 14 is a flow of the ID detection processing DRV50. This processing detects an ID unique to a flat display by issuing a request command (step DRV50-10-DRV50-30).

Figure 15:
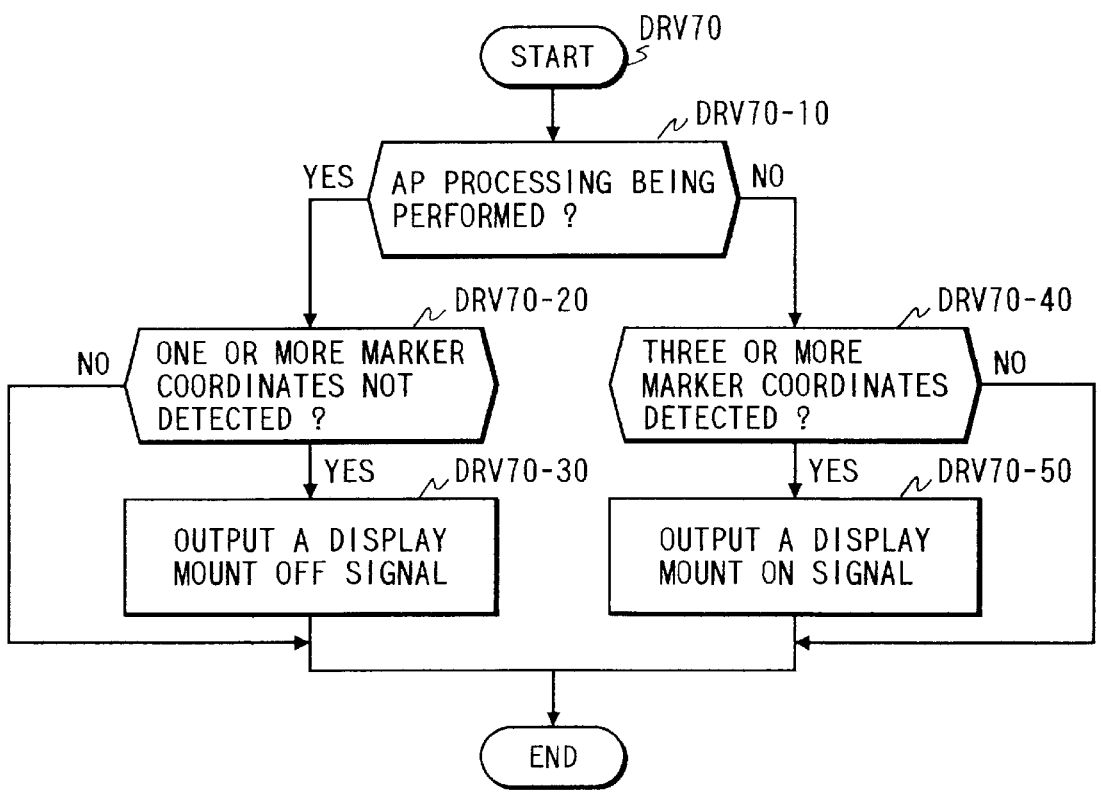
FIG. 15 is a display mount processing flow in the embodiment of the invention.

FIG. 15 is a flow of a display mount detection processing DRV70. This processing detects when the flat display leaves the TB and when it is mounted on it. The processing turns off a display mount signal when the display is lifted from the TB, i.e., if the AP processing is being performed and at the same time any one of the markers is not detected. Conversely, the display mount signal is turned on when the AP processing is not being performed and at the same all the markers are detected. The mounting order of two or more displays can easily be detected by managing the switching history of the display mount signal for each display.

Figure 16:
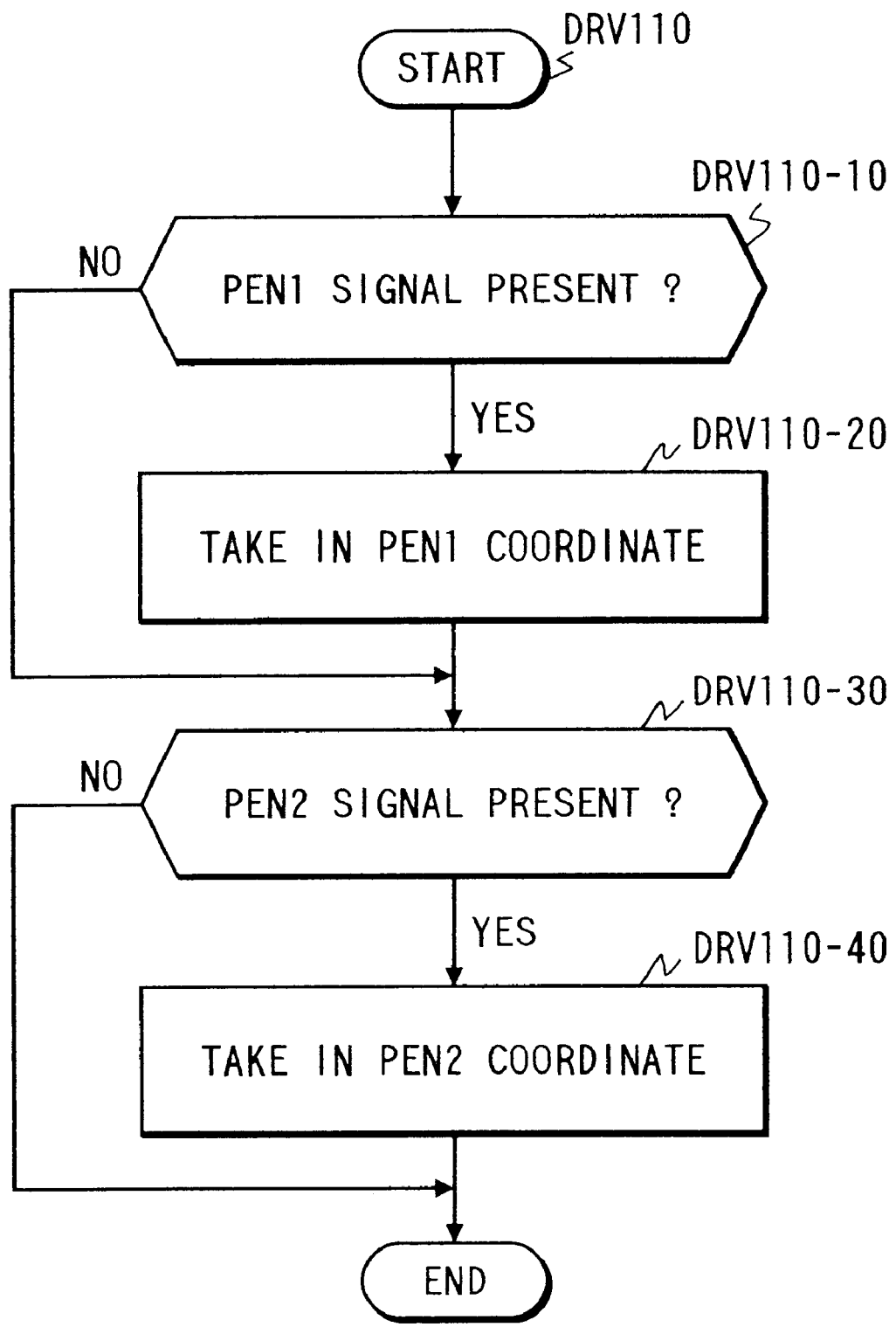
FIG. 16 is a pen coordinate detection processing flow in the embodiment of the invention.

FIG. 16 is a flow of the pen coordinate detection processing DRV110. This processing takes in coordinates of a plurality of pens only when there are PEN1 and PEN2 signals (step DRV100-10-DRV100-40).

Figure 17A:
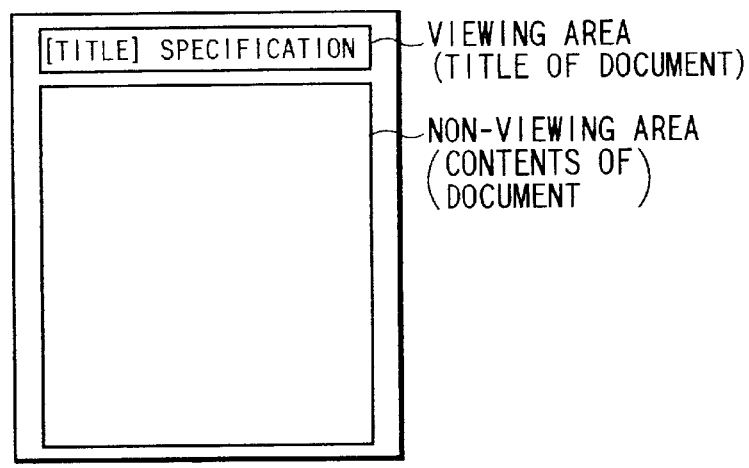
FIG. 17A is a schematic diagram showing how an authentication processing is performed in the embodiment of the invention.
Figure 17B:
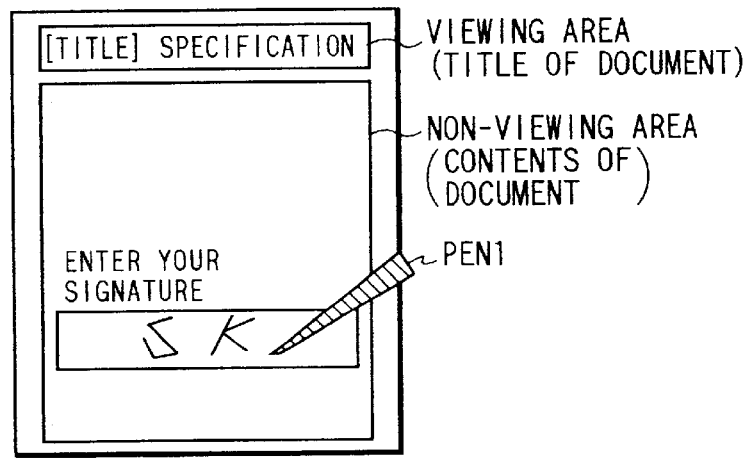
FIG. 17B is a schematic diagram showing how an authentication processing is performed in the embodiment of the invention.
Figure 17C:
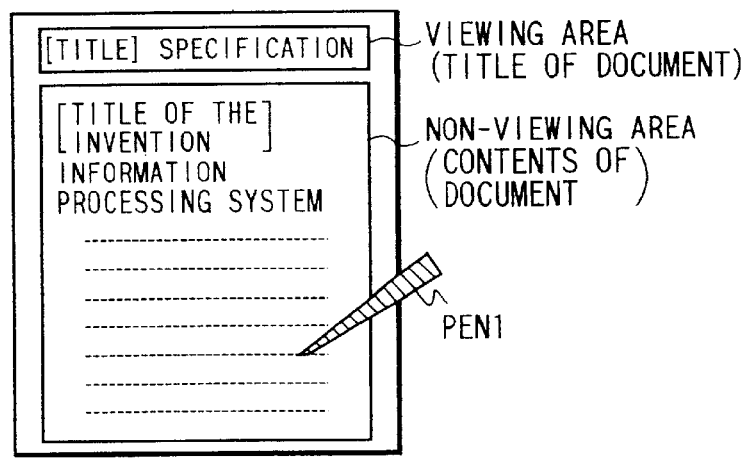
FIG. 17C is a schematic diagram showing how an authentication processing is performed in the embodiment of the invention.

In the embodiment of this invention, because the display can be separated from the coordinate input device, it has portability like paper. Therefore, there are times when security becomes a problem, as when the display is lost or information is inadvertently seen by third persons. For this reason, a security management is required. FIG. 17 is a schematic diagram showing the authentication processing DRV80 for security management. The authentication processing may use an input of a pass word or a signature or a combination of both. In this embodiment, the authentication processing using a signature input will be described. First, as illustrated in FIG. 17, the display screen has a viewing area and a non-viewing area. This area definition is carried out by the authentication screen definition processing (not shown in the software configuration of FIG. 9). In the viewing area are normally displayed such things as will pose no problem in terms of security, such as titles of documents or mails. The non-viewing area may contain the contents of documents. When one wishes to view the information contained in the non-viewing area, as shown in FIG. 17B, the operator picks the non-viewing area with a pen PEN1. In response to this pen-down operation, a message "Enter your signature" appears. If the entered signature agrees with a registered signature, the information is displayed in the non-viewing area, as shown in FIG. 17C. If the signature does not agree, the information in the non-viewing area of course does not appear.

The aforementioned embodiment of this invention has the following advantages.

As a first advantage, because the flat display is interfaced with the processing device (including TB) through a non-contact interface means (cordless), the flat display can be mounted at any desired position on the processing device. It is also possible to put the display at an angle when writing as you would paper, improving the man-machine interface.

A second advantage is that because a plurality of flat displays can be used, a first display may be assigned to a word processing work and a second one to a system menu. In this way, it is possible to effectively utilize the display by assigning a desired attribute to the display. This in turn allows the use of a greater area of the display screen. Further, because two or more displays can be stacked together with a variety of functions assigned as desired, they can be manipulated intuitively.

A third advantage is that by checking unique IDs of flat displays, the same work environment can be provided even when a plurality of displays are used or when the displays are moved onto other pen-input information processing device. Further, if the display mount detection means is related to the program save/restore processing, it is possible to directly enter into the environment in which the previous work was being done, by simply mounting the flat display on the desk.

A fourth advantage is that because the behaviors of the display and the coordinate input device are continuously monitored, the system can make quick responses. Hence, it is possible, for example, to make pen-inputs while shifting the display, substantially improving the operability.

Next, other embodiments of this invention will be described in the following.

Although in the first embodiment, the ID is given to the flat display, it may be given to the stylus pen. This offers an advantage that there is no need to carry the flat display and the work can be done anywhere as long as a person holds a pen.

While the flat display of the first embodiment can make the both-side display, it is possible to have the display show information on only one side. In this case, the front/back decision is not necessary, obviating the markers.

In the first embodiment, the layout decision is made by using the markers. The layout may also be detected by monitoring the display from a camera on the desk and performing the image processing. This layout detection method using an image processing, though it has a coarse coordinate precision, can be applied to simple pointing.

Although the first embodiment incorporates the coordinate input device along with the processing device in the desk surface, it may be put on the conventional OA desk in the form of a mat. This avoids replacing the desk with a new one in providing the functions of this invention.

In the first embodiment, the flat display is connected through a cordless interface means to the processing device including the coordinate input device so that the display can be carried. It is also possible to connect them with a cord and a clip so that the display can be separated from the processing device while being written on. Although the second embodiment requires removing the clip when carrying the display, it offers an advantage of being able to tilt the display like paper.

As mentioned above, by checking the positional relationship between the processing device including the coordinate input device and the display, it is possible to freely layout the display on the coordinate input device. It is therefore possible to place the display at an angle on the desk as you would the paper, or to stack two or more displays to assign desired functions to the individual displays, greatly improving the man-machine interface. Further, because the display and the coordinate input device are physically separated, the display can be made thin and lightweight.

What is claimed is:

1. An information processing system for exchanging information between a processing device and a display without using a cord, the display being mountable on the processing device;

wherein the processing device includes
a cordless interface circuit which transmits code data of characters and drawings to the display, and
a display mount detecting unit which detects whether the display is mounted on the processing device; and
wherein the display includes a controller which converts the code data transmitted by the cordless interface circuit of the processing device into image information.

2. An information processing system for exchanging information between a processing device and a plurality of displays without using a cord, each of the displays being mountable on the processing device, the displays having respective unique identifiers assigned thereto;

wherein the processing device includes
a cordless interface circuit which selectively transmits code data of characters and drawings to each of the displays based on the unique identifiers assigned to the displays, and
a display mount detecting unit which detects whether each of the displays is mounted on the processing device; and
wherein each of the displays includes a controller which converts the code data transmitted by the cordless interface circuit of the processing device into image information.

* * * * *